(12) United States Patent
Lee

(10) Patent No.: US 12,724,555 B2
(45) Date of Patent: Sep. 1, 2026

(54) CONTROL METHOD OF FLASH MEMORY CONTROLLER CAPABLE OF IMPROVING ENERGY CONVERSION EFFICIENCY

(71) Applicant: Silicon Motion, Inc., Hsinchu County (TW)

(72) Inventor: Chun-Cheng Lee, Yilan County (TW)

(73) Assignee: Silicon Motion, Inc., Hsinchu County (TW)

( * ) Notice: Subject to any disclaimer, the term of this patent is extended or adjusted under 35 U.S.C. 154(b) by 36 days.

(21) Appl. No.: 18/921,018

(22) Filed: Oct. 21, 2024

(65) Prior Publication Data

US 2026/0111134 A1 Apr. 23, 2026

(51) Int. Cl.
*G06F 3/06* (2006.01)

(52) U.S. Cl.
CPC .......... *G06F 3/0635* (2013.01); *G06F 3/0604* (2013.01); *G06F 3/0679* (2013.01)

(58) Field of Classification Search
CPC ..... G06F 3/0635; G06F 3/0604; G06F 3/0679
See application file for complete search history.

(56) References Cited

U.S. PATENT DOCUMENTS

| | | | | |
|---|---|---|---|---|
| 2017/0090752 | A1* | 3/2017 | Wakchaure | G06F 3/064 |
| 2019/0121558 | A1* | 4/2019 | Lee | G06F 3/0679 |
| 2023/0091792 | A1* | 3/2023 | Kanno | G06F 3/0679 711/103 |
| 2023/0384977 | A1 | 11/2023 | Park | |
| 2025/0298762 | A1* | 9/2025 | Turmes | G06F 13/20 |

FOREIGN PATENT DOCUMENTS

| | | | |
|---|---|---|---|
| TW | 201035771 | A1 | 10/2010 |
| TW | 201216292 | A1 | 4/2012 |
| TW | 202405651 | A | 2/2024 |

* cited by examiner

*Primary Examiner* — Nicholas A. Paperno
(74) *Attorney, Agent, or Firm* — Winston Hsu

(57) ABSTRACT

The present invention provides a control method for a flash memory controller and an associated device, wherein the flash memory controller is coupled between a host device and a flash memory module. By setting a first bandwidth for communicating with the host device and determining a reference data rate according to configuration information of the flash memory module, the controller can determine whether the first bandwidth far exceeds a required bandwidth. If so, the bandwidth is dynamically reduced to a lower second bandwidth, thereby avoiding unnecessary power consumption.

7 Claims, 5 Drawing Sheets

CONTROL METHOD OF FLASH MEMORY CONTROLLER CAPABLE OF IMPROVING ENERGY CONVERSION EFFICIENCY

BACKGROUND OF THE INVENTION

1. Field of the Invention

The present invention relates to a flash memory controller.

2. Description of the Prior Art

Peripheral Component Interconnect Express (PCIe) is a high-speed interface standard used for connecting various components in computers and servers, such as graphics cards, storage devices, and networking cards. Each version of PCIe has introduced improvements in bandwidth and performance. For example, bandwidth per lane of PCIe 3.0 is 8 GT/s (Giga-transfers per second), bandwidth per lane of PCIe 4.0 is 16 GT/s, and bandwidth per lane of PCIe 5.0 is 32 GT/s.

A Solid State Drive (SSD) is a type of storage device that uses NAND flash memory to store data, providing faster access speeds, higher durability, and lower power consumption compared to traditional Hard Disk Drives (HDDs). The PCIe interface plays a crucial role in connecting SSDs to a host device such as computer's motherboard, enabling high-speed data transfer and enhancing overall system performance.

In conventional SSDs with a PCIe interface, when the SSD connects to the host device, both are configured to the maximum allowable bandwidth. For instance, if the SSD supports PCIe 5.0, the SSD and the host device will be set to a bandwidth of 32 GT/s per lane. This configuration remains in place for all data transmission and reception. However, due to the variability in user interaction with electronic devices, such as merely watching online videos or typing on a computer, the data transfer between the host device and the SSD may be minimal. In these situations, maintaining a high-bandwidth configuration, which consumes more energy, will result in unnecessary energy waste.

SUMMARY OF THE INVENTION

Therefore, one of the objectives of this invention is to propose a flash memory controller, which can adjust the maximum bandwidth according to the configuration information of the flash memory module and current throughput between the flash memory controller and the host device, to solve the above problems described in the prior art.

According to one embodiment of the present invention, a control method of a flash memory controller is disclosed. The flash memory controller is coupled between a host device and a flash memory module, and the flash memory controller is configured to receive a command from the host device to access the flash memory module; and the control method comprises: setting a first bandwidth for communicating with the host device; determining a reference data rate according to configuration information of the flash memory module; determining if the first bandwidth far exceeds a required bandwidth according to the reference data rate; and if it is determined that the first bandwidth far exceeds the required bandwidth, setting a second bandwidth lower than the first bandwidth, for communicating with the host device.

According to one embodiment of the present invention, a flash memory controller configured to receive a command from a host device to access a flash memory module is disclosed. The flash memory controller comprises a read-only memory, a buffer memory, a microprocessor and a traffic monitor, wherein the microprocessor is configured to execute the program code to control access of the flash memory module. The traffic monitor is configured to perform the steps of: setting a first bandwidth for communicating with the host device; determining a reference data rate according to configuration information of the flash memory module; determining if the first bandwidth far exceeds a required bandwidth according to the reference data rate; and if it is determined that the first bandwidth far exceeds the required bandwidth, setting a second bandwidth lower than the first bandwidth, for communicating with the host device.

According to one embodiment of the present invention, a memory device comprising a flash memory module and a flash memory controller configured to receive a command from a host device to access the flash memory module is disclosed. The flash memory controller is configured to perform the steps of: setting a first bandwidth for communicating with the host device; determining a reference data rate according to configuration information of the flash memory module; determining if the first bandwidth far exceeds a required bandwidth according to the reference data rate; and if it is determined that the first bandwidth far exceeds the required bandwidth, setting a second bandwidth lower than the first bandwidth, for communicating with the host device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
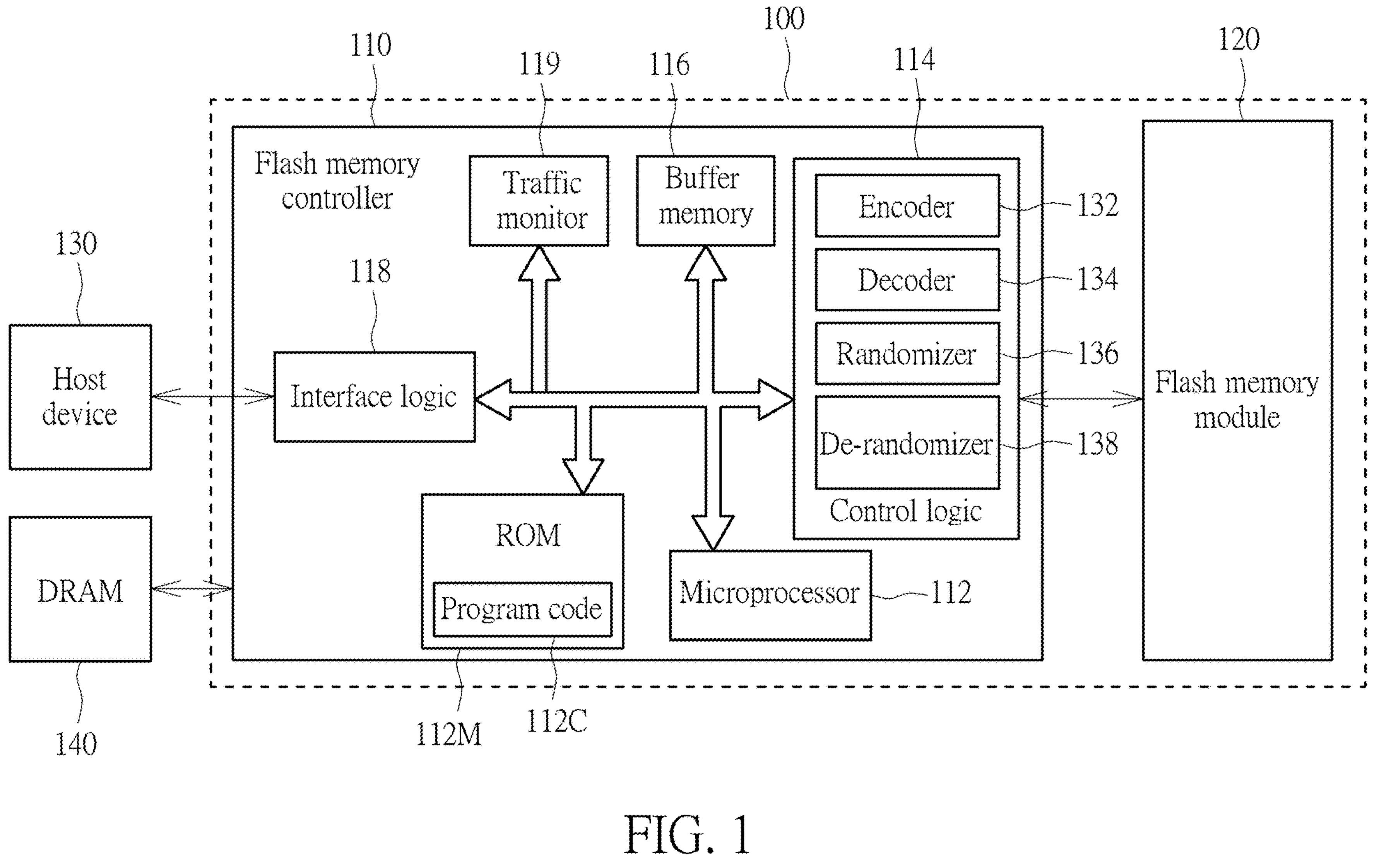
FIG. 1 is a diagram illustrating a memory device according to an embodiment of the present invention.

FIG. 1 is a diagram illustrating a memory device 100 according to an embodiment of the present invention. The memory device 100 includes a flash memory module 120 and a flash memory controller 110, wherein the flash memory controller 110 is arranged to access the flash memory module 120. The flash memory controller 110 includes a microprocessor 112, a read only memory (ROM) 112M, a control logic 114, a buffer memory 116, an interface logic 118 and a traffic monitor 119. The ROM 112M is arranged to store a program code 112C, and the microprocessor 112 is arranged to execute the program code 112C to control access of the flash memory module 120. The control logic 114 includes an encoder 132, a decoder 134, a randomizer 136 and a de-randomizer 138. The encoder 132 is arranged to encode data that is written into the flash memory module 120 to generate a corresponding parity (also known as an error correction code (ECC)), and the decoder 134 is arranged to decode data that is read from the flash memory module 120. The randomizer 136 is used to randomize the data written to the flash memory module 120, and the de-randomizer 138 is used to de-randomize the data read from the flash memory module 120.

In a general situation, the flash memory module 120 includes a plurality of flash memory chips, and each flash memory chip includes a plurality of blocks. A controller (e.g. the flash memory controller 110 that executes the program code 112C through the microprocessor 112) may copy, erase, and merge data for the flash memory module 120 with a block as a unit. In addition, a block can record a specific number of pages, wherein the controller (e.g. the flash memory controller 110 that executes the program code 112C through the microprocessor 112) may perform a data write operation upon the flash memory module 120 with a page as a unit. In other words, a block is the smallest erase unit in the flash memory module 120, and a page is the smallest write unit in the flash memory module 120.

In practice, the flash memory controller 110 that executes the program code 112C through the microprocessor 112 may utilize its own internal components to perform many control operations. For example, the flash memory controller 122 utilizes the control logic 114 to control access of the flash memory module 120 (more particularly, access at least one block or at least one page), utilizes the buffer memory 116 and/or a DRAM 140 to perform a required buffering operation, and utilizes the interface logic 118 to communicate with a host device 130.

In one embodiment, the memory device 100 may be a portable memory device such as a memory card which conforms to one of the SD/MMC, CF, MS and XD specifications, and the host device 130 is an electronic device able to be connected to the memory device 100, such as a cellphone, a laptop, a desktop computer, etc. In another embodiment, the memory device 100 can be a solid state drive (SSD) or an embedded storage device conforming to the universal flash storage (UFS) or embedded multi-media card (EMMC) specifications, and can be arranged in an electronic device. For example, the memory device 100 can be arranged in a cellphone, a watch, a portable medical testing device (e.g. a medical wristband), a laptop, or a desktop computer. In this case, the host device 130 can be a processor of the electronic device.

In this embodiment, the flash memory module 120 is a three-dimensional (3D) NAND-type flash memory, in which each block is composed of multiple word lines, multiple bit lines and multiple memory cells. Since the 3D NAND flash memory architecture is well known to those with ordinary knowledge in the art, no further explanation is given in the specification.

Figure 2:
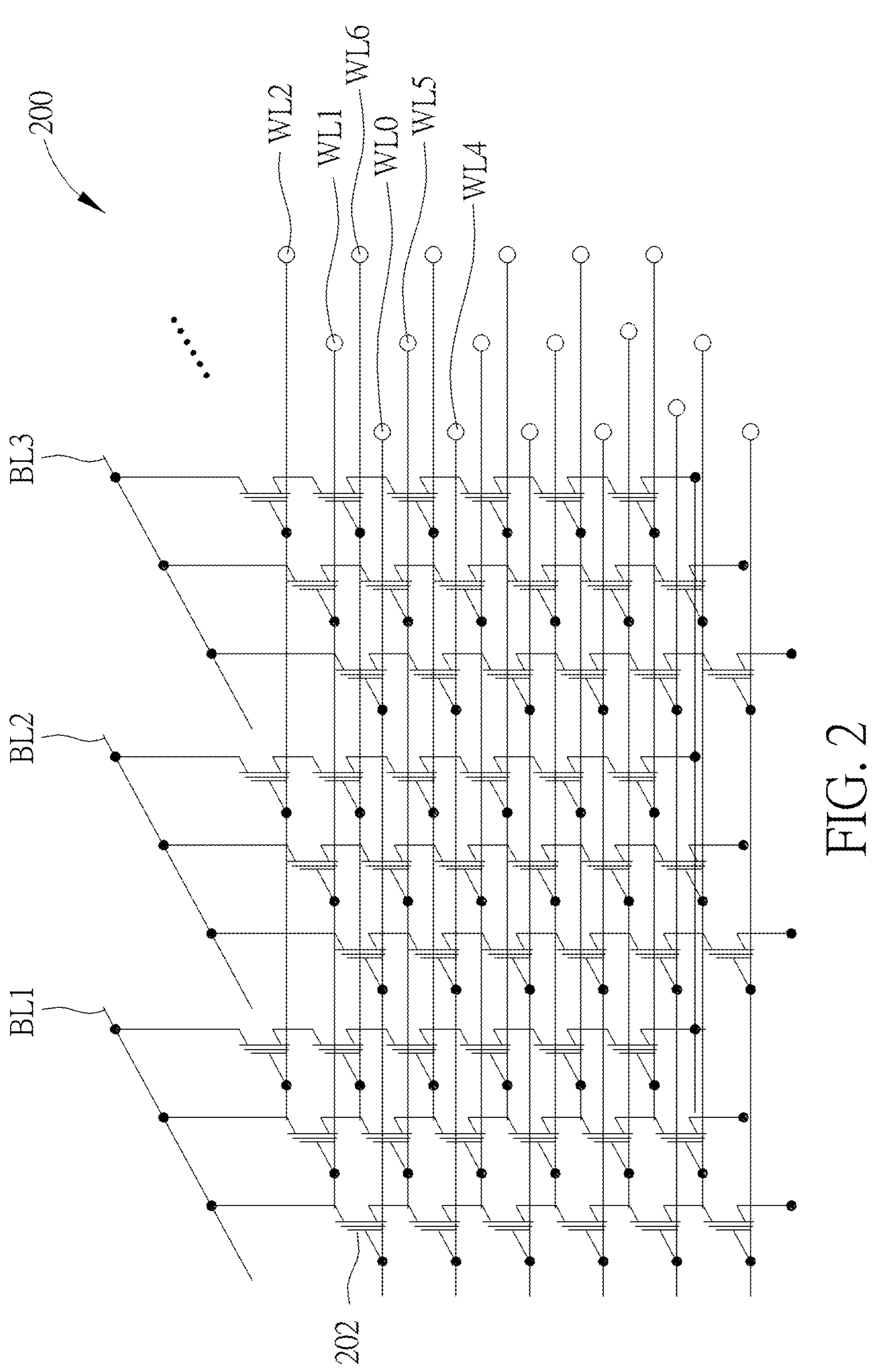
FIG. 2 is a diagram illustrating a block in the flash memory module according to one embodiment of the present invention

FIG. 2 is a diagram illustrating a block 200 in the flash memory module 120 according to one embodiment of the present invention, wherein the flash memory module 120 may be a 3D NAND-type flash memory. As shown in FIG. 2, the block 200 comprises multiple memory units (e.g. the floating-gate transistor 202 or other charge trap element), which form the 3D NAND-type flash memory mechanism via multiple bit lines (e.g. the bit lines BL1-BL3 shown in the figure, but the present invention is not limited thereto) and word lines (e.g. the word lines WL0-WL2, WL4-WL6 shown in the figure). Take the uppermost plane in in FIG. 2 as example, all floating-gate transistors on the word line WL0 form at least one page, all floating-gate transistors on the word line WL1 form at least another page, and all floating-gate transistors on the word line WL2 further form yet at least another page, and so on. Further, due to different writing manners of the flash memory, the definition of the relationship between the word line WL0 and pages (i.e. logical pages) will also be different. Specifically, when writing with the single-level cell (SLC) technique, all floating-gate transistors on the word line WL0 are only corresponding to one single logical page (i.e., each memory unit stores only one bit, and the block 200 serves as a SLC block); when writing with the multi-level cells (MLC) technique, all floating-gate transistors on the word line WL0 are corresponding to two logical pages (i.e., each memory unit stores two bits, and the block 200 serves as a MLC block); when writing with the triple-level cell (TLC) technique, all floating-gate transistors on the word line WL0 are corresponding to three logical pages (i.e., each memory unit stores three bits, and the block 200 serves as a TLC block); and when writing with the quad-level cell (QLC) technique, all floating-gate transistors on the word line WL0 are corresponding to four logical pages (i.e., each memory unit stores four bits, and the block 200 serves as a QLC block). Since one skilled in the art should be readily to understand the structure of the 3D NAND-type flash memory and the relationship between word lines and pages, the detailed descriptions are omitted here for brevity.

Different types of blocks have different access times, and the memory units included in the blocks will require longer access times if they need to store more bits. Specifically, the QLC block has the longest access time, while the SLC block has the fastest access speed. From another perspective, the flash memory controller 110 has the lowest throughput when accessing the QLC blocks, and the flash memory controller 110 has the highest throughput when accessing the SLC blocks.

Figure 3:
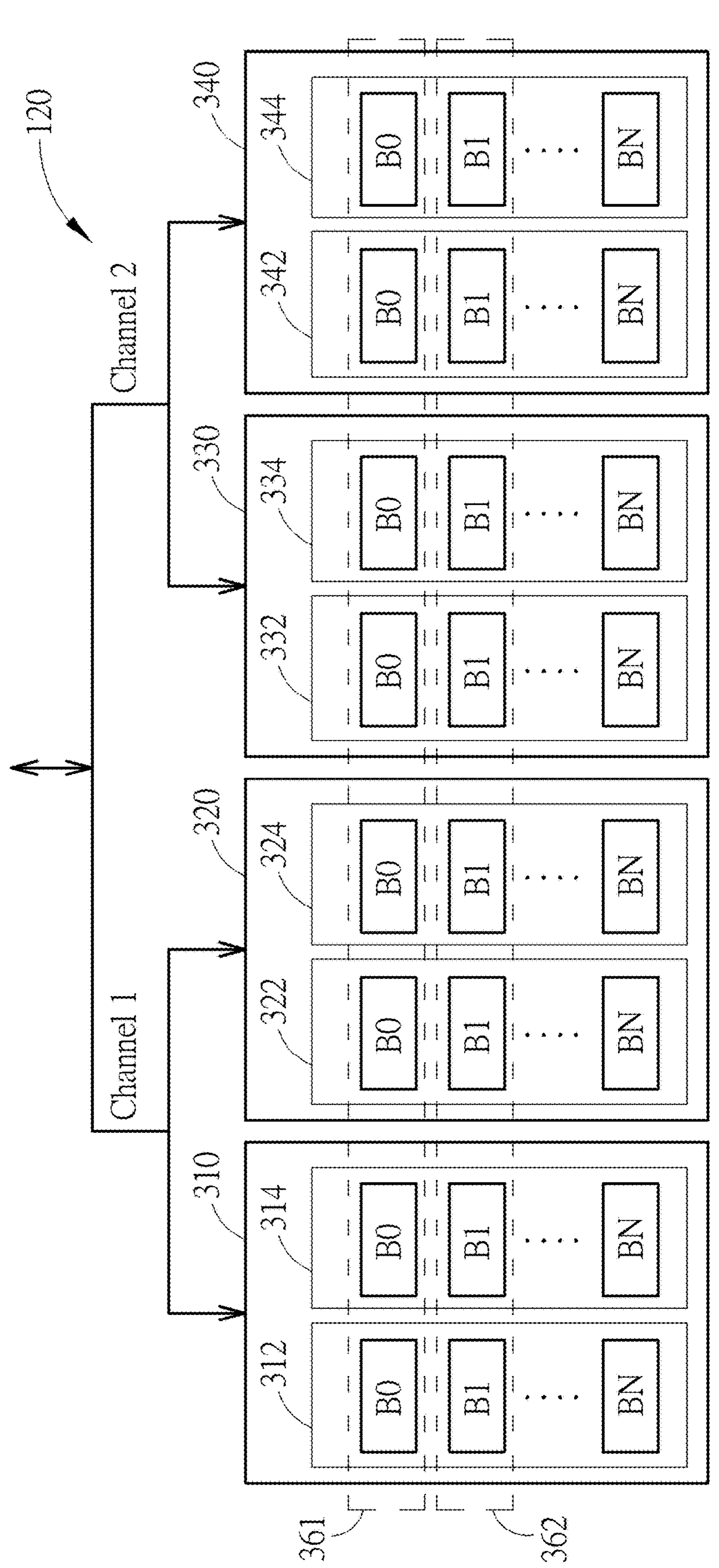
FIG. 3 is a diagram illustrating configuration of a super block in the flash memory module.

With regard to actual implementation of the flash memory module 120, the flash memory controller 110 configures the blocks belonging to different planes in the flash memory module 120 into a super block to facilitate the management of data access. Specifically, referring to FIG. 3, the flash memory module comprises two channels, channel 1 and channel 2, which are respectively connected to multiple flash memory chips 310, 320, 330 and 340, wherein the flash memory chip 310 includes two planes 312 and 314, the flash memory chip 320 includes two planes 322 and 324, the flash memory chip 330 includes two planes 332 and 334, the flash memory chip 340 includes two planes 342 and 344, and each plane includes multiple blocks B0-BN. In the process of configuring or initializing the flash memory module 120, the flash memory controller 110 configures first blocks B0 of all planes as a super block 361, second blocks B1 of all planes as a super block 362, and so on. As shown in FIG. 3, the super block 361 comprises eight physical blocks, and the flash memory controller 110 treats the super block 361 as a normal block when accessing the super block 361. For example, the super block 361 itself is an erasing unit, that is, although the eight blocks B0 of the super block 361 can be erased separately, the flash memory controller 110 must erase the eight blocks B0 together. In addition, data writing of the super block 361 can be performed upon the first page of the plane 312, the first page of the plane 314, the first page of the plane 322, and the first page of the plane 324, sequentially. After the data writing of the first page of the plane 344 is completed, the subsequent data is written sequentially to the second page of the plane 312, the second page of the plane 314, and so on. In other words, the flash memory controller 110 does not start data writing of the second page of each block B0 in the super block 361 until data writing of the first page of each block B0 in the super block 361 is completed. The super block is a logical collection block set by the flash memory controller 110 to facilitate management of the flash memory module 120 and is not a physical collection block. In addition, when performing garbage collection, calculating effective pages of block, and calculating block write time, the flash memory controller 110 can also perform the calculations in units of super blocks.

Because the blocks within the super block can be accessed in parallel, the number of channels, the number of dies, and/or the number of planes corresponding to the super block can reflect the bandwidth/speed between the flash memory controller 110 and the flash memory module 120. For example, when other configurations of the memory device 100 are the same, a greater number of channels, a greater number of dies, and/or a greater number of planes corresponding to one super block will have a higher bandwidth/speed between the flash memory controller 110 and the flash memory module 120.

In this embodiment, since the maximum bandwidth required between the host device 130 and the memory device 100 is limited by the type of blocks being accessed and the configuration information of the flash memory module 120, the present invention provides a traffic monitor 119 to control the maximum bandwidth between host device 130 and the memory device 100 according to the type of blocks being accessed and/or the configuration information of the flash memory module 120, so as to avoid using a large bandwidth with high energy consumption to transmit low data volume, to avoid unnecessary power consumption.

Figure 4:
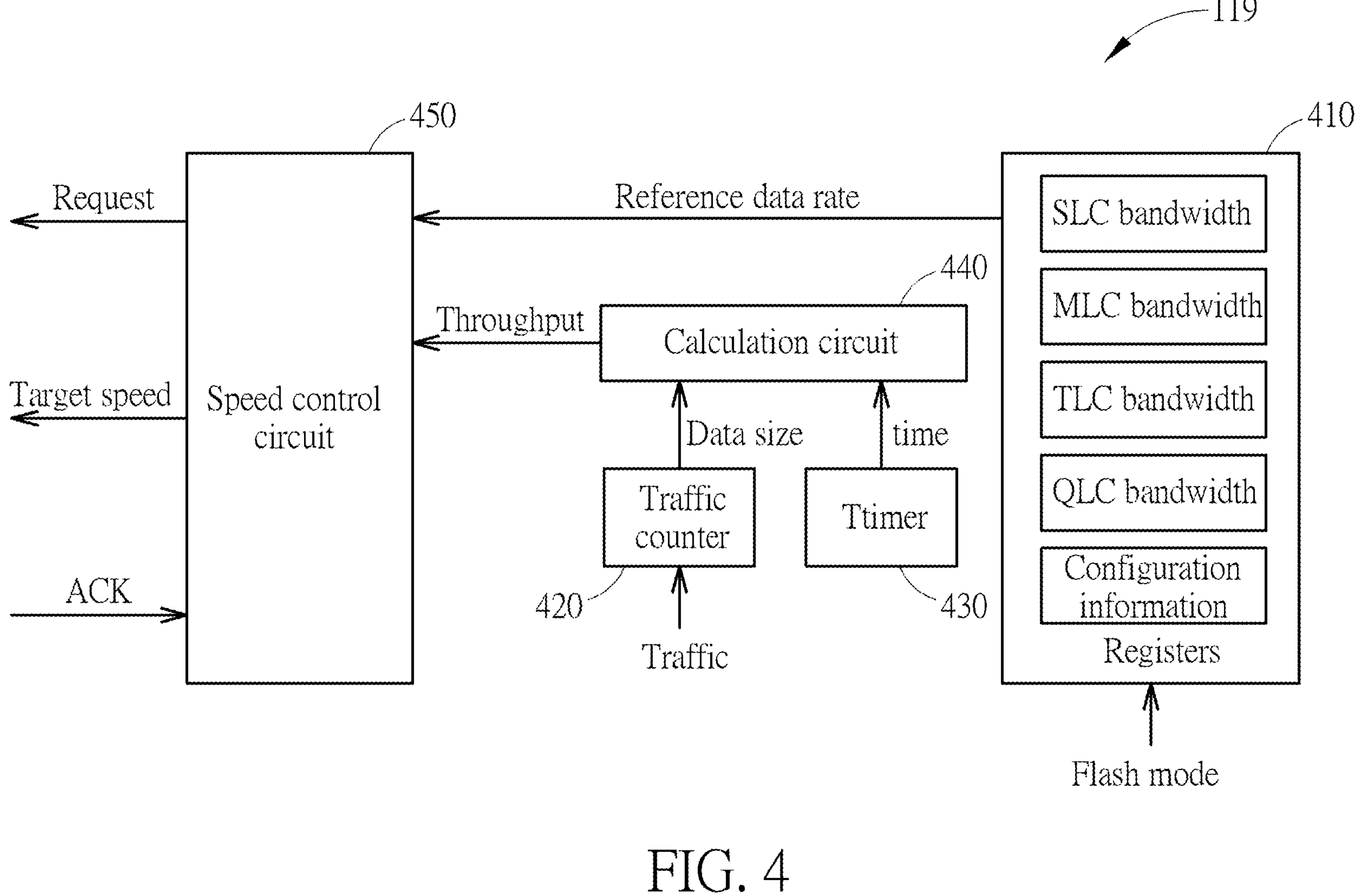
FIG. 4 is a diagram illustrating a traffic monitor according to one embodiment of the present invention.

FIG. 4 is a diagram illustrating the traffic monitor 119 according to one embodiment of the present invention, wherein the traffic monitor 119 is implemented by hardware, that is the traffic monitor 119 is a traffic monitor implemented by circuit elements. As shown in FIG. 4, the traffic monitor 119 comprises registers 410, a traffic counter 420, a timer 430, a calculation circuit 440 and a speed control circuit 450. The registers 410 are configured to store a flash mode written by the microprocessor 112, For example, the registers 410 stores the SLC bandwidth, MLC bandwidth, TLC bandwidth, QLC bandwidth and the configuration information such as the number of channels, the number of dies, and/or the number of planes corresponding to the super block. The SLC bandwidth may refer to the maximum bandwidth between the flash memory controller 110 and the flash memory module 120 when the flash memory controller 110 accesses SLC blocks, the MLC bandwidth may refer to the maximum data rate between the flash memory controller 110 and the flash memory module 120 when the flash memory controller 110 accesses MLC blocks, the TLC bandwidth may refer to the maximum data rate between the flash memory controller 110 and the flash memory module 120 when the flash memory controller 110 accesses TLC blocks, and the QLC bandwidth may refer to the maximum data rate between the flash memory controller 110 and the flash memory module 120 when the flash memory controller 110 accesses QLC blocks. In this embodiment, the SLC bandwidth is greater than the MLC bandwidth, the MLC bandwidth is greater than the TLC bandwidth, and the TLC bandwidth is greater than the QLC bandwidth.

In addition, the configuration information recorded in the registers 410 may include the type of block that is read/written currently. For example, if the flash memory controller 110 is accessing a SLC block within the flash memory module 120, the microprocessor 112 updates the configuration information to record that the block currently being accessed is an SLC block; and if the flash memory controller 110 is accessing a TLC block within the flash memory module 120, the microprocessor 112 updates the configuration information to record that the block currently being accessed is a TLC block.

The traffic counter 420 is configured to count the data size transmitted between the host device 130 and the flash memory controller 110. The timer 430 is configured to provide a length of time from when the traffic counter 420 starts counting data size to the present time. The calculation circuit 440 is configured to calculate the throughput between the host device 130 and the flash memory controller 110 according to the data size provided by the traffic counter 420 and the time provided by the timer 430.

The speed control circuit 450 is configured to determine a suitable bandwidth between the host device 130 and the memory device 100 according to the information provided by the registers 410 and the throughput calculated by the calculation circuit 440. Specifically, the information of the registers 410 can be used as a reference data rate, and the speed control circuit 450 may refer to the reference data rate and the throughput between the host device 130 and the memory device 100 to adjust the bandwidth dynamically, wherein the reference data rate may be a maximum possible data rate between the flash memory controller 110 and the flash memory module 120. In one embodiment, the flash memory controller 110 may have multiple predetermined bandwidths, wherein the multiple predetermined bandwidths may correspond to multiple versions of PCIe specifications. For example, the multiple predetermined bandwidths may correspond to 64 GT/s per lane, 32 GT/s per lane, 16 GT/s per lane, 8 GT/s per lane, and 5 GT/s per lane respectively correspond to PCIe 6.0, PCIe 5.0, PCIe 4.0, PCIe 3.0 and PCIe 2.0.

It is noted that the reference data rate determined according to the information provided by the registers 410 may be changed. Specifically, if the flash memory controller 110 is accessing the SLC block within the flash memory module 120, the speed control circuit 450 determines a higher reference data rate due to the fastest access speed. If the flash memory controller 110 is accessing the QLC block within the flash memory module 120, the speed control circuit 450 determines a lower reference data rate due to the longer access times.

In one embodiment, if the flash memory controller 110 and the host device 130 are initially negotiated to have a first bandwidth such as 32 GT/s per lane, and the speed control circuit 450 of the traffic monitor 119 refers to the information of the registers 410 and the type of block that is accessed currently to determine that the reference data rate is lower than a threshold value determined based on a second bandwidth, the speed control circuit 450 can determine that the current bandwidth far exceeds the required bandwidth, resulting in a waste of power consumption, wherein the second bandwidth is a next lower bandwidth such as 16 GT/s per lane, and the threshold value may be equal to 80% of the second bandwidth. In this case, the speed control circuit 450 will send a request and a target speed (target bandwidth) to a PCIe media access control (MAC) layer within the interface logic 118, wherein the target speed may be the second bandwidth such as 16 GT/s per lane. Then, after the interface logic 118 negotiates with the host device 130 to complete the speed adjustment, the PCIe MAC layer transmits an acknowledgement (ACK) to the speed control circuit 450 to finish this speed adjustment.

In one embodiment, if the flash memory controller 110 and the host device 130 have a third bandwidth such as 8 GT/s per lane, and the speed control circuit 450 of the traffic monitor 119 determines that the throughput provided by the calculation circuit 440 is greater than a threshold value determined based on the third bandwidth (e.g, the threshold value is equal to 80% of the third bandwidth), the speed control circuit 450 can determine that the current bandwidth is too close to the required bandwidth, which may affect the performance of the flash memory controller 110 in subsequent operations. In this case, the speed control circuit 450 will send a request and a target speed (target bandwidth) to a PCIe MAC layer within the interface logic 118, wherein the target speed may be a next higher bandwidth such as 16 GT/s per lane. Then, after the interface logic 118 negotiates with the host device 130 to complete the speed adjustment, the PCIe MAC layer transmits an ACK to the speed control circuit 450 to finish this speed adjustment.

In one embodiment, if the flash memory controller 110 and the host device 130 have a fourth bandwidth such as 16 GT/s per lane, and the speed control circuit 450 of the traffic monitor 119 determines that the throughput provided by the calculation circuit 440 is lower than a threshold value determined based on a fifth bandwidth, the speed control circuit 450 can determine that the current bandwidth far exceeds the required bandwidth, resulting in a waste of power consumption, wherein the fifth bandwidth is a next lower bandwidth such as 8 GT/s per lane, and the threshold value may be equal to 80% of the fifth bandwidth. In this case, the speed control circuit 450 will send a request and a target speed (target bandwidth) to a PCIe MAC layer within the interface logic 118, wherein the target speed may be the fifth bandwidth such as 8 GT/s per lane. Then, after the interface logic 118 negotiates with the host device 130 to complete the speed adjustment, the PCIe MAC layer transmits an ACK to the speed control circuit 450 to finish this speed adjustment.

Figure 5:
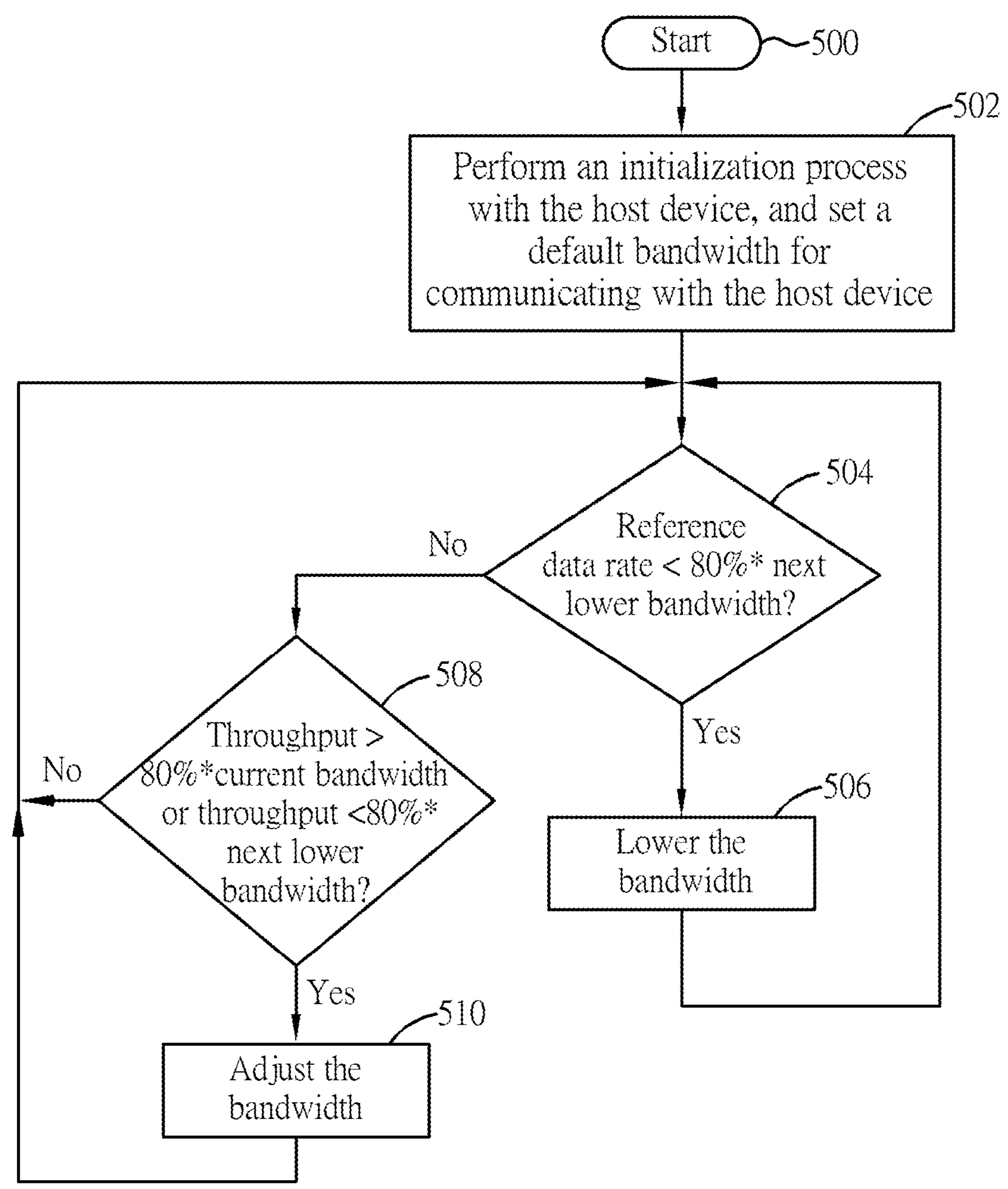
FIG. 5 is a flowchart of control method of the flash memory controller according to one embodiment of the present invention.

FIG. 5 is a flowchart of a control method of the flash memory controller 110 according to one embodiment of the present invention. In Step 500, the flow starts, and the memory device 110 is powered on and connected with the host device 130. In Step 502, the flash memory controller 110 performs an initialization process with the host device 130, and sets a default bandwidth for communicating with the host device 130. In this embodiment, the default bandwidth is a maximum bandwidth supported by the flash memory controller 110. For example, if the PCIe interface of the flash memory controller 110 supports up to PCIe 5.0, the default bandwidth is 32 GT/s per lane; and if the PCIe interface of the flash memory controller 110 supports up to PCIe 6.0, the default bandwidth is 64 GT/s per lane. In addition, the microprocessor 112 writes the flash mode into the registers 410 of the traffic monitor 119, wherein the flash mode includes the SLC bandwidth, MLC bandwidth, TLC bandwidth, QLC bandwidth and the configuration information such as the number of channels, the number of dies, and/or the number of planes corresponding to the super block.

In Step 504, the speed control circuit 450 determines a reference data rate according to the information recorded in the registers 410 and the type of block currently accessed, and the speed control circuit 450 further determines if the reference data rate is lower than a next lower bandwidth of the current set bandwidth (e.g., if the current bandwidth is 64 GT/s per lane corresponding to PCIe 6.0, the next lower bandwidth is 32 GT/s per lane corresponding to PCIe 5.0), if yes, the flow enters Step 506; and if not, the flow enters Step 508.

In one embodiment, the speed control circuit 450 may determine the higher reference data rate when the super block corresponds to a greater number of channels, a greater number of dies, and/or a greater number of planes. In one embodiment, the speed control circuit 450 may determine the higher reference data rate when the block that is read/written currently is the SLC block or the MLC block, and determines the lower reference data rate when the block that is read/written currently is the TLC block or the QLC block. In one embodiment, the speed control circuit 450 may determine the reference data rate by using a look-up table recording different combinations of configuration information and type of blocks and corresponding reference data rates.

In Step 506, the speed control circuit 450 determines that the current bandwidth far exceeds the required bandwidth, so the speed control circuit 450 sends a request and a target bandwidth to a PCIe MAC layer within the interface logic 118 to lower the bandwidth between the flash memory controller 110 and the host device 130. In this embodiment, the target bandwidth is the next lower bandwidth of the current bandwidth.

In Step 508, the speed control circuit 450 gets the current throughput between the host device 130 and the flash memory controller 110 from the calculation circuit 440, and the speed control circuit 450 further determines if the throughput is greater than a first threshold value determined based on the current bandwidth between the host device 130 and flash memory controller 110, and determines if the throughput is lower than a second threshold value determined based on a next lower bandwidth of the current bandwidth. In this embodiment, the first threshold value may be 80% of the current bandwidth, and the second threshold value may be 80% of the next lower bandwidth of the current bandwidth. If the throughput satisfies one of the above conditions, the flow enters Step 510; and if the throughput does not satisfy any one of the above conditions, the flow goes back to Step 504.

In Step 510, the speed control circuit 450 determines that the current bandwidth is not suitable now, so the speed control circuit 450 sends a request and a target bandwidth to a PCIe MAC layer within the interface logic 118 to increase or decrease the bandwidth between the flash memory controller 110 and the host device 130. Specifically, if it is determined that the throughput is greater than the first threshold value such as 80% of the current bandwidth, the speed control circuit 450 determines that the current bandwidth is too close to the required bandwidth, so the speed control circuit 450 sends a request to a PCIe MAC layer within the interface logic 118 to increase the bandwidth between the host device 130 and the flash memory controller 110. In addition, if it is determined that the throughput is lower than the second threshold value such as 80% of the next lower bandwidth of the current bandwidth, the speed control circuit 450 determines that the current bandwidth far exceeds the required bandwidth, so the speed control circuit 450 sends a request to the PCIe MAC layer within the interface logic 118 to lower the bandwidth between the flash memory controller 110 and the host device 130.

In summary, in the flash memory controller and associated control method of the present invention, by adjusting the bandwidth between the flash memory controller and the host device according to the configuration information of the flash memory module and/or the current throughput between the flash memory controller and the host device, the most appropriate bandwidth can be set to avoid using a large bandwidth with high energy consumption to transmit low data volume, to avoid unnecessary power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a flash memory controller, wherein the flash memory controller is coupled between a host device and a flash memory module, and the flash memory controller is configured to receive a command from the host device to access the flash memory module; and the control method comprises:

setting a first bandwidth for communicating with the host device;

determining a reference data rate according to configuration information of the flash memory module;

determining if the first bandwidth exceeds a required bandwidth according to the reference data rate; and if it is determined that the first bandwidth exceeds the required bandwidth, setting a second bandwidth lower than the first bandwidth, for communicating with the host device;

wherein the step of determining the reference data rate according to configuration information of the flash memory module comprises:

determining the higher reference data rate when a super block within the flash memory module corresponds to a greater number of channels, a greater number of dies, and/or a greater number of planes.

2. The control method of claim 1, wherein the configuration information comprises a number of channels, a number of dies, and/or a number of planes corresponding to the super block within the flash memory module.

3. The control method of claim 1, wherein the configuration information comprises a type of block that is read/written currently within the flash memory module, wherein the type of block refers to whether the block is a single-level cell (SLC) block, a multi-level cells (MLC) block, a triple-level cell (TLC) block or a quad-level cell (QLC) block.

4. A control method of a flash memory controller, wherein the flash memory controller is coupled between a host device and a flash memory module, and the flash memory controller is configured to receive a command from the host device to access the flash memory module; and the control method comprises:

setting a first bandwidth for communicating with the host device;

determining a reference data rate according to configuration information of the flash memory module;

determining if the first bandwidth exceeds a required bandwidth according to the reference data rate; and if it is determined that the first bandwidth exceeds the required bandwidth, setting a second bandwidth lower than the first bandwidth, for communicating with the host device;

wherein the configuration information comprises a type of block that is read/written currently within the flash memory module, wherein the type of block refers to whether the block is a single-level cell (SLC) block, a multi-level cells (MLC) block, a triple-level cell (TLC) block or a quad-level cell (QLC) block;

wherein the step of determining the reference data rate according to configuration information of the flash memory module comprises:

determining the higher reference data rate when the block that is read/written currently is the SLC block or the MLC block; and determining the lower reference data rate when the block that is read/written currently is the TLC block or the QLC block.

5. A control method of a flash memory controller, wherein the flash memory controller is coupled between a host device and a flash memory module, and the flash memory controller is configured to receive a command from the host device to access the flash memory module; and the control method comprises:

setting a first bandwidth for communicating with the host device;

determining a reference data rate according to configuration information of the flash memory module;

determining if the first bandwidth exceeds a required bandwidth according to the reference data rate; and if it is determined that the first bandwidth exceeds the required bandwidth, setting a second bandwidth lower than the first bandwidth, for communicating with the host device;

wherein the flash memory controller records multiple predetermined bandwidths, the first bandwidth and the second bandwidth are two of the multiple predetermined bandwidths, and the second bandwidth is a next lower bandwidth of the first bandwidth; and the step determining if the first bandwidth exceeds the required bandwidth according to the reference data rate comprises:

determining if the reference data rate is lower than a threshold value determined based on the second bandwidth; and if it is determined that the reference data rate is lower than the threshold value, determining that the first bandwidth exceeds the required bandwidth.

6. A control method of a flash memory controller, wherein the flash memory controller is coupled between a host device and a flash memory module, and the flash memory controller is configured to receive a command from the host device to access the flash memory module; and the control method comprises:

setting a first bandwidth for communicating with the host device;

determining a reference data rate according to configuration information of the flash memory module;

determining if the first bandwidth exceeds a required bandwidth according to the reference data rate; and if it is determined that the first bandwidth exceeds the required bandwidth, setting a second bandwidth lower than the first bandwidth, for communicating with the host device;

wherein the flash memory controller records multiple predetermined bandwidths, the first bandwidth is one of the multiple predetermined bandwidths; and the control method further comprises:

if it is determined that the first bandwidth does not exceed the required bandwidth, determining if a throughput between the flash memory controller and the host device is greater than a threshold value determined based on the first bandwidth; and if it is determined that the throughput between the flash memory controller and the host device is greater than the threshold value, setting a third bandwidth greater than the first bandwidth, for communicating with the host device.

7. A control method of a flash memory controller, wherein the flash memory controller is coupled between a host device and a flash memory module, and the flash memory controller is configured to receive a command from the host device to access the flash memory module; and the control method comprises:

setting a first bandwidth for communicating with the host device;

determining a reference data rate according to configuration information of the flash memory module;

determining if the first bandwidth exceeds a required bandwidth according to the reference data rate; and if it is determined that the first bandwidth exceeds the required bandwidth, setting a second bandwidth lower than the first bandwidth, for communicating with the host device;

wherein the flash memory controller records multiple predetermined bandwidths, the first bandwidth and the second bandwidth are two of the multiple predetermined bandwidths, and the second bandwidth is a next lower bandwidth of the first bandwidth; and the control method further comprises:

if it is determined that the first bandwidth does not exceed the required bandwidth, determining if a throughput between the flash memory controller and the host device is lower than a threshold value determined based on the second bandwidth; and if it is determined that the throughput between the flash memory controller and the host device is lower than the threshold value, setting the second bandwidth for communicating with the host device.

* * * * *